(12) United States Patent  (10) Patent No.: US 10,324,934 B2
Bhandari et al.  (45) Date of Patent: Jun. 18, 2019

(54) METHOD AND DEVICE FOR PROVIDING CONTENT RECOMMENDING INFORMATION TO DEVICES

(71) Applicant: Samsung Electronics Co., Ltd., Suwon-si, Gyeonggi-do (KR)

(72) Inventors: Ashish Bhandari, Noida (IN); Ayush Jain, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 629 days.

(21) Appl. No.: 14/939,487

(22) Filed: Nov. 12, 2015

(65) Prior Publication Data

US 2016/0132563 A1 May 12, 2016

(30) Foreign Application Priority Data

Nov. 12, 2014 (IN) .......................... 3266/DEL/2014
Oct. 26, 2015 (KR) ........................ 10-2015-0148823

(51) Int. Cl.
*G06F 16/00* (2019.01)
*G06F 16/2457* (2019.01)
(Continued)

(52) U.S. Cl.
CPC ........ *G06F 16/24575* (2019.01); *G06F 3/147* (2013.01); *G06F 3/1454* (2013.01);
(Continued)

(58) Field of Classification Search
CPC .............. G06F 17/211; G06F 17/2247; G06F 17/2288; G06F 17/30; G06F 17/30315; G06F 17/30598; G06F 17/30867; G06F 3/0484; G06F 11/3013; G06F 11/3438; G06F 11/3476; G06F 21/6245; H04N 21/25866; H04N 21/25891; H04N 21/2668; H04N 21/8173; H04N 21/00; H04N 21/23614; H04N 21/26258; H04N 21/26283; H04N 21/2665; H04N 21/4508; H04N 21/4821; H04N 21/6582; H04N 21/812; H04N 21/854; H04N 21/2187; H04N 21/23418
See application file for complete search history.

(56) References Cited

U.S. PATENT DOCUMENTS 8,607,267 B2 * 12/2013 Shkedi .................. G06Q 30/02
725/32
9,026,668 B2 * 5/2015 Harrison ................ H04L 67/42
709/229
(Continued)

OTHER PUBLICATIONS

Scott Orgera, "How to CLear History in Popular Web Browsers", About Tech, http://browsers.about.com/od/allaboutwebbrowsers/a/how-to-manage-browsing-history-and-other-privatedata.htm.
(Continued)

*Primary Examiner* — Yicun Wu
(74) *Attorney, Agent, or Firm* — Jefferson IP Law, LLP

(57) ABSTRACT

A method and a device for providing content recommending information are provided. The method includes receiving first log information of an external device, generating content recommending information based on the first log information and second log information of the first device, and displaying the content recommending information.

16 Claims, 17 Drawing Sheets

(51) Int. Cl.

| | | |
|---|---|---|
| *G06F 3/147* | (2006.01) | |
| *G06F 3/14* | (2006.01) | |
| *G06F 16/248* | (2019.01) | |
| *G06F 16/23* | (2019.01) | |
| *G06F 16/9535* | (2019.01) | |
| *G09G 5/12* | (2006.01) | |
| *G06F 16/957* | (2019.01) | |

(52) U.S. Cl.
CPC ........ *G06F 16/2358* (2019.01); *G06F 16/248* (2019.01); *G06F 16/24573* (2019.01); *G06F 16/9535* (2019.01); *G06F 16/9577* (2019.01); *G09G 5/12* (2013.01); *G09G 2360/121* (2013.01); *G09G 2370/04* (2013.01); *G09G 2370/06* (2013.01)

(56) References Cited

U.S. PATENT DOCUMENTS

| | | | |
|---|---|---|---|
| 9,071,886 B2* | 6/2015 | Shkedi | H04N 21/812 |
| 2008/0214157 A1* | 9/2008 | Ramer | G06F 17/30749 |
| | | | 455/414.1 |
| 2009/0248680 A1* | 10/2009 | Kalavade | G06Q 30/0267 |
| 2013/0014158 A1* | 1/2013 | Bhatia | H04N 21/252 |
| | | | 725/34 |
| 2014/0082515 A1* | 3/2014 | Baalu | G06F 3/0481 |
| | | | 715/745 |
| 2015/0172777 A1* | 6/2015 | Park | H04N 21/4826 |
| | | | 725/43 |

OTHER PUBLICATIONS

Arvind Saini, "Get List of All Installed Apps: Android", Codebucket, http://codebucket.co.in/android-get-list-of-allinstalled-apps/.

Pasquale Lops, Marco de Gemmis and Giovanni Semeraro, "Content-based Recommender Systems: State of the Art and Trends", pp. 73-105, Springer Science + Business Media, LLC 2011.

Nicolaas Matthijs and Filip Radlinski, "Personalizing Web Search Using Long Term Browsing History", Feb. 12, 2011, ACM, 978-1-4503-0493, WSDM'11, Hong Kong, China.

Jure Leskovec, Anand Rajaraman and Jeffrey D. Ullman, "Mining of Massive Datasets" 2010-2014.

Christoffer Davidsson, "Moble Application Recommender System", Dec. 2010, ISSN; 1401-5749, UPTEC IT 10 025, Uppsala Universitet, Box 536, 751 21 Uppsala.

Renata Ghisloti de Souza, Raja Chiky and Zakia Kazi Aoul, "Open Source Recommendation Systems of Mobile Application", Workshop on the Practical Use of Recommender Systems, Algorithms and Technologies (PRSAT 2010) Sep. 30, 2010, Barcelona, Spain.

UN65H6400AF, http://www.samsung.com/us/support/faq/faq00060248/87778/65H6400AFXZA.

"Collaborative filtering", http://en.wikipedia.org/wiki/collaborative_filtering, Oct. 25, 2015.

"Recommender system", http://en.wikipedia.org/wiki/recommender_system, Nov. 6, 2015.

* cited by examiner

METHOD AND DEVICE FOR PROVIDING CONTENT RECOMMENDING INFORMATION TO DEVICES

CROSS-REFERENCE TO RELATED APPLICATION(S)

This application claims the benefit under 35 U.S.C. § 119(a) of an Indian patent application filed on Nov. 12, 2014 in the India Patent Office and assigned Serial number 3266/DEL/2014, and a Korean patent application filed on Oct. 26, 2015 in the Korean Intellectual Property Office and assigned Serial number 10-2015-0148823, the entire disclosure of each of which is hereby incorporated by reference.

TECHNICAL FIELD

The present disclosure relates to a device and method for providing content recommendation information. More particularly, the present disclosure relates to a device and method for providing content recommending information for a device based on other devices in an Internet of things (IOT) or a smart home environment.

BACKGROUND

Content includes various types of information provided through the Internet or computer communication. Owing to developments in Internet and communication technologies, a large amount of content has become available to be provided to users, which has caused a new expression "content stress" to be formed and makes it difficult for users to select necessary content.

To solve such a difficulty for users, many systems that recommend content to users according to at least one of user preference and interest, popularity depending on the times, and category, are provided.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and systems capable of generating content recommending information and displaying the content recommending information to a device by using a keyword included in user log information of the device.

Additional aspects will be set forth in part in the description which follows and, in part, will be apparent from the description, or may be learned by practice of the presented various embodiments.

In accordance with an aspect of the present disclosure, an operating method performed by a first device is provided. The operating method includes receiving first log information of an external device; generating content recommending information based on the first log information and second log information of the first device; and displaying the content recommending information.

In accordance with another aspect of the present disclosure, a first device is provided. The first device includes a communication unit configured to receive first log information of an external device; a control unit configured to generate content recommending information based on the first log information and second log information of the first device; and a display unit configured to display the content recommending information.

In accordance with another aspect of the present disclosure, a first device is provided. The first device includes a communication unit configured to receive a plurality of log information, each corresponding to an external device; a control unit configured to generate content recommending information based on the plurality of log information and log information of the first device; and a display unit configured to display the content recommending information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
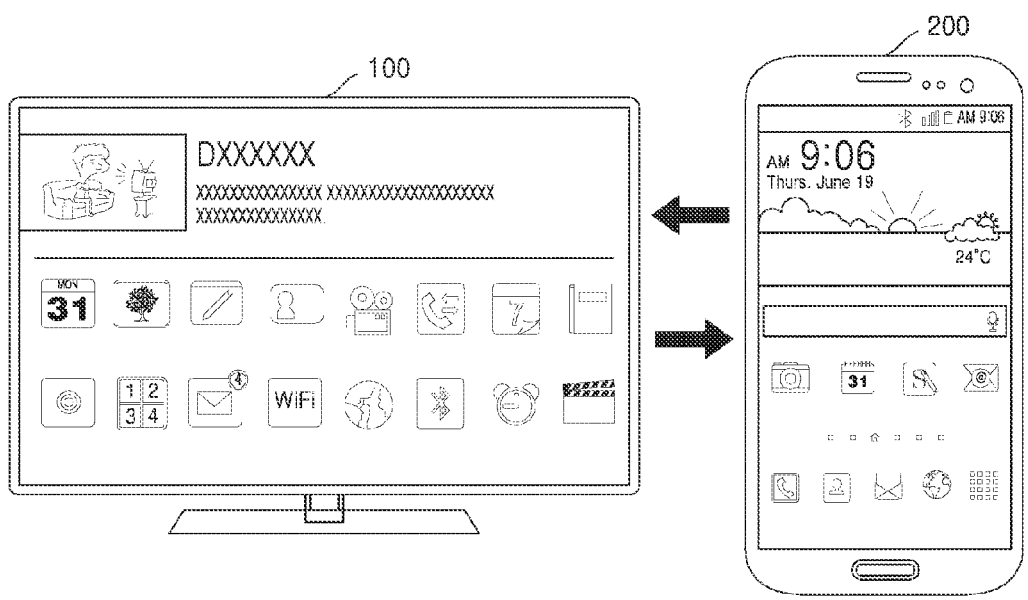
FIG. 1 is a diagram describing a method in which a first device provides content recommending information by using log information of a second device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the present application, when a part "includes" an element, it is to be understood that the part may additionally include other elements rather than excluding other elements as long as there is no particular opposing recitation. Thus, a process or method that comprises a list of operations does not include only those operations but may include other operations not expressly listed or inherent to such process or method. Similarly, one or more devices or sub-systems or elements or structures proceeded by "includes" does not, without more constraints, preclude the existence of other devices or other sub-systems. Also, the terms such as " . . . unit", "module", or the like used in the present application indicate an unit, which processes at least one function or motion, and the unit may be implemented by hardware or software, or by a combination of hardware and software.

Throughout this description, the term "first device" is broadly referred to any device which may provide content recommendation based on its own log information and log information of at least one second device by either generating content recommending information itself or by transmitting the log information used to generate the content recommending information to a server. The term "second device" or "external device" is broadly referred to any device which may receive the content recommending information but may not generate the content recommending information.

The various embodiments will now be described more fully with reference to the accompanying drawings for those of ordinary skill in the art to be able to perform the various embodiments. The various embodiments may, however, be embodied in many different forms and should not be construed as being limited to the embodiments set forth herein; rather, these embodiments are provided so that this disclosure will be thorough and complete, and will fully convey the concept of the disclosure to those of ordinary skill in the art. Also, parts in the drawings unrelated to the detailed description are omitted to ensure clarity of the various embodiments. Like reference numerals in the drawings denote like elements, and thus their description will not be repeated. As used herein, the term "and/or" includes any and all combinations of one or more of the associated listed items). Expressions such as "at least one of," when preceding a list of elements, modify the entire list of elements and do not modify the individual elements of the list.

FIG. 1 is a diagram describing a method in which a first device provides content recommending information by using log information of a second device according to an embodiment of the present disclosure.

Referring to FIG. 1, the first device 100 may be a smart television (TV) but this is merely an example. The first device 100 may be implemented as a smart phone, a tablet, a digital camera, a camcorder, a laptop computer, a desktop, an e-book terminal, a digital broadcasting terminal, a personal digital assistant (PDA), a portable multimedia player (PMP), a navigation system, a Moving Picture Experts Group phase 1 or phase 2 (MPEG-1 or MPEG-2) audio layer 3 (MP3) player, a wearable device, or a home appliance.

The second device 200 may, for example, be a smart phone. The second device 200 may also be implemented as a smart TV, a tablet, a digital camera, a camcorder, a laptop computer, a desktop, an e-book terminal, a digital broadcasting terminal, a PDA, PMP, a navigation system, an MP3 player, a wearable device, or a home appliance.

In an embodiment of the present disclosure, the first device 100 may perform handshaking with the second device 200 to receive first log information from the second device 200. Handshaking means transmitting and receiving signals for establishing a connection and synchronization between two devices.

To perform handshaking, the second device 200 may transmit a synchronization signal to the first device 100, and the first device 100 may transmit an acknowledgement signal to the second device 200 in response to the synchronization signal. If handshaking is completely performed, the first device 100 may receive the first log information from the second device 200. The first log information may include at least one of cache files, cookies, a browsing history, a download history, and a search history that are stored in the second device 200, content stored in the second device 200, and data necessary for executing at least one piece of content in the second device 200.

The first device 100 may generate the content recommending information by using the first log information and second log information. The second log information may include at least one of cache files, cookies, a browsing history, a download history, and a search history that are stored in the first device 100, contents stored in the first device 100, and data necessary for executing at least one piece of content in the first device 100.

The first device 100 may detect recommendation keywords from the first log information and the second log information. The first device 100 may generate the content recommending information based on the recommendation keyword.

In an embodiment, the first device 100 may generate the content recommending information by using only the first log information.

In an embodiment, the first device 100 may display the content recommending information on a display unit thereof.

In an embodiment, the first device 100 may transmit the content recommending information to the second device 200.

Figure 2:
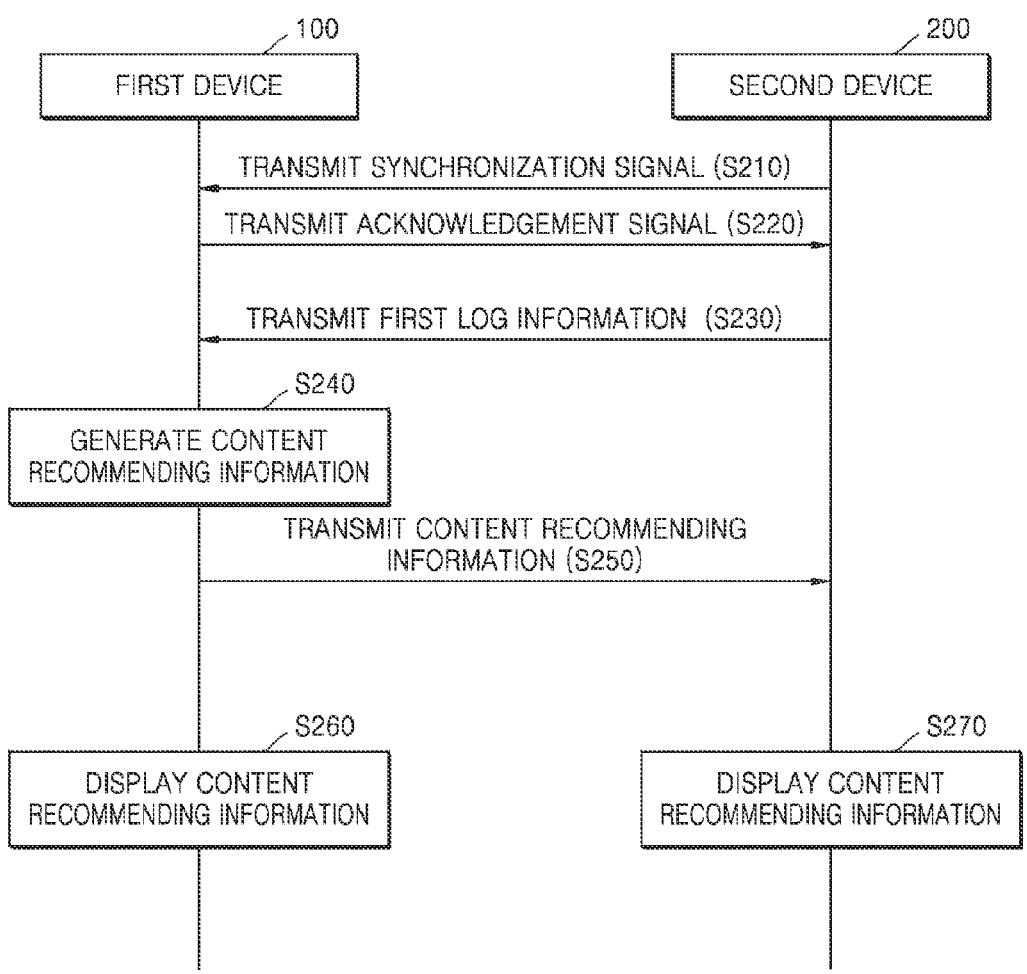
FIG. 2 is a flowchart of a method of communicating between a first device and a second device and a method of providing content recommending information by using device log information according to an embodiment of the present disclosure.

FIG. 2 is a flowchart of a method of communicating between a first device and a second device and a method of providing content recommending information by using device log information according to an embodiment of the present disclosure.

Referring to FIG. 2, the first device 100 may perform handshaking with the second device 200.

The second device 200 may transmit a synchronization signal to the first device 100 at operation S210. The first device 100 may transmit an acknowledgement signal to the second device 200 in response to the synchronization signal at operation S220. If handshaking is completely performed, the second device 200 may transmit first log information to the first device 100 at operation S230. The first device 100 may generate the content recommending information by using the received first log information and second log information thereof at operation S240. The first device 100 may transmit the content recommending information to the second device 200 at operation S250. The first device 100 and the second device 200 may display the content recommending information on a display unit at operations S260 and S270.

In an embodiment, the first device 100 may generate the content recommending information by using only the received first log information.

In an embodiment, the first log information may include at least one of cache files, cookies, a browsing history, a download history, and a search history that are stored in the second device 200, content stored in the second device 200, and data necessary for executing at least one piece of content in the second device 200. The second log information may include at least one of cache files, cookies, a browsing history, a download history, and a search history that are stored in the first device 100, content stored in the first device 100, and data necessary for executing at least one piece of content in the first device 100.

In an embodiment, the first log information may be received from the second device 200 through a short range communication technology. The short range communication technology may include at least one of near field communication (NFC), Wi-Fi, Bluetooth, infrared (IR), or Wi-Fi direct.

In an embodiment, the first device 100 and the second device 200 may be included in a home network or Internet of things (IOT).

In an embodiment, content may include at least one of applications, books, music, audio/video (A/V) data, services, game, multimedia, video, calendar, schedule, configuration, and user accessible data.

In an embodiment, the first device 100 and the second device 200 may store the content recommending information in a storage unit.

In an embodiment, the first device 100 and the second device 200 may control a display unit based on the generated content recommending information.

In an embodiment, the first device 100 may control the display unit based on the content recommending information. For example, the first device 100 may display content included in the content recommending information differently from content that is not included in the content recommending information on the display unit. For example, the first device 100 may differentiate display locations or magnitude of the content included in the content recommending information and the content that is not included in the content recommending information.

When the first device 100 does not store a recommended content included in the content recommending information, the first device 100 according to an embodiment controls downloading of the recommended content from an external server.

Figure 3:
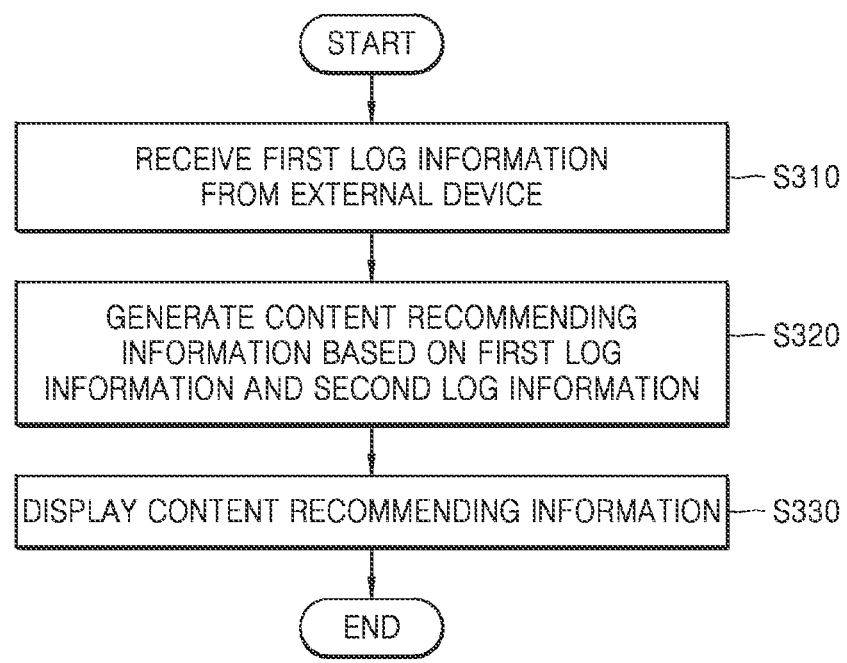
FIG. 3 is a flowchart of a method in which a first device provides content recommending information according to an embodiment of the present disclosure.

FIG. 3 is a flowchart of a method in which a first device provides content recommending information according to an embodiment of the present disclosure.

Referring to FIG. 3, the first device 100 may receive first log information from an external device at operation S310. The first device 100 may perform handshaking with the external device. To perform handshaking, the external device may transmit a synchronization signal to the first device 100, and the first device 100 may transmit an acknowledgement signal to the external device in response to the synchronization signal. If handshaking is completely performed, the first device 100 may receive the first log information from the external device. The first log information may include at least one of cache files, cookies, a browsing history, a download history, and a search history that are stored in the external device, content stored in the external device, and data necessary for executing at least one piece of content in the external device.

The first device 100 may generate the content recommending information based on the first log information and second log information at operation S320. The second log information may include at least one of cache files, cookies, a browsing history, a download history, and a search history that are stored in the first device 100, contents stored in the first device 100, and data necessary for executing at least one piece of content in the first device 100.

The first device 100 may analyze and process the first log information and the second log information and generate a user profile. The user profile may include information reflecting user preference for selecting content.

In an embodiment, the user profile may include recommendation keywords detected based on the frequency among keywords included in the first log information and the second log information.

In an embodiment, the first device 100 may generate the content recommending information including one or more pieces of recommended contents based on the user profile. The first device 100 may compare the recommendation keywords and content's information and include a content having the content's information matching the recommendation keywords in the recommended content. The content's information may include titles of contents, metadata thereof, and descriptions thereof.

In an embodiment, the first device 100 may receive only log information relating to a specific user by using user login input information. The log information relating to the specific user may include a search history, a browsing history, a content play list, etc., which are compiled as the specific user uses the first device 100 or the external device, among log information stored in a device. When the first device 100 generates the user profile based on only the log information relating to the specific user, a personalized user profile may be generated. When the first device 100 generates the content recommending information based on the personalized user profile, the content recommending information reflecting only content preference of the specific user may be generated.

In an embodiment, the first device 100 may transmit the first log information and the second log information to a server. The server may generate the content recommending information based on the first log information and the second log information and transmit the generated content recommending information to the first device 100.

In an embodiment, the first device 100 may transmit the user profile to the server. The server that has received the user profile may generate the content recommending information based on the user profile and transmit the generated content recommending information to the first device 100.

In an embodiment, the first device 100 may store the user profile in a storage unit. The first device 100 may update a user profile that is previously stored in the storage unit by using at least one of the newly received first log information and second log information.

The first device 100 may display the content recommending information through a display unit at operation S330. The display unit may differently display content included in the content recommending information and content that is not included in the content recommending information on the display unit. For example, the display unit of the first device 100 may differentiate display locations or magnitude of the content included in the content recommending information and the content that is not included in the content recommending information. In addition, the display unit may differentiate the content included in the content recommending information and the content that is not included in the content recommending information using graphic adjustment such as highlighting, grouping, etc.

In an embodiment, the first device 100 may output the content recommending information as audio through an audio output unit.

In an embodiment, the first device 100 may transmit the content recommending information to the external device.

Figure 4:
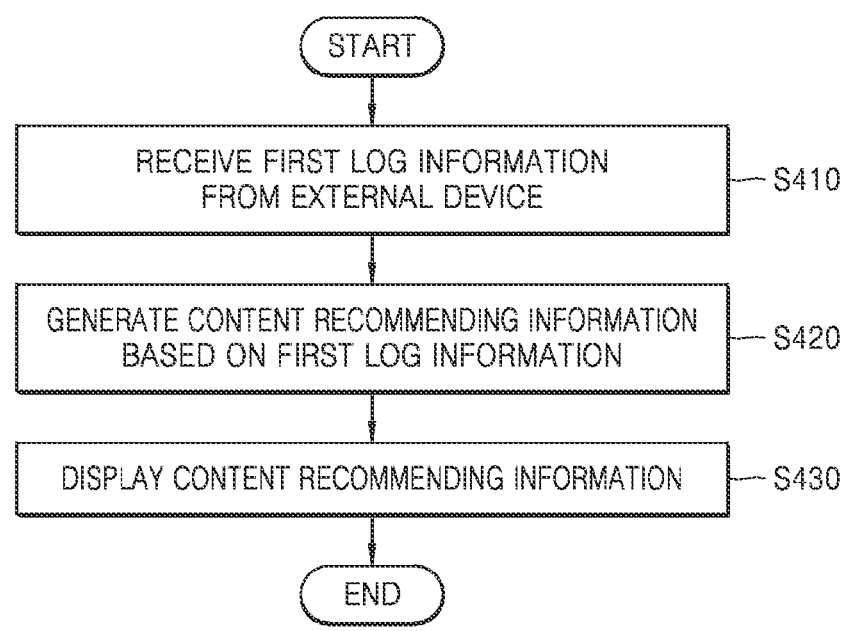
FIG. 4 is a flowchart of a method in which a first device provides content recommending information according to an embodiment of the present disclosure.

FIG. 4 is a flowchart of a method in which a first device provides content recommending information according to an embodiment of the present disclosure.

Referring to FIG. 4, the first device 100 may receive first log information from an external device at operation S410. The first device 100 may perform handshaking with the external device. The first log information may include a device use history of a user stored in the external device as described above.

The first device 100 may generate the content recommending information based only the first log information at operation S420. The first device 100 may generate the content recommending information by using the first log information received from the external device. In this regard, the first device 100 may store log information for the first device 100 but may not use the stored log information to generate the content recommending information. Alternatively, the first device 100 may be a device that does not store its own log information.

In an embodiment, the first device 100 may generate a user profile by analyzing and processing the first log information. The user profile may include information reflecting user preference for selecting content.

In an embodiment, the user profile may include recommendation keywords detected based on the frequency among keywords included in the first log information.

In an embodiment, the first device 100 may generate the content recommending information including one or more pieces of recommended contents based on the user profile. The first device 100 may compare the recommendation keywords and content information and include content having the content's information matching the recommendation keywords in recommended content. The content's information may include titles of contents, metadata thereof, and descriptions thereof.

In an embodiment, the first device 100 may receive only log information relating to a specific user among the log information stored in the external device by using user login input information. The log information relating to the specific user may include a search history, a browsing history, a content reproduction list, etc., which are compiled as the specific user uses the external device, among the log information stored in the external device. When the first device 100 generates the user profile based on only the log information relating to the specific user, a personalized user profile may be generated. When the first device 100 generates the content recommending information based on the personalized user profile, the content recommending information reflecting only content preference of the specific user may be generated.

In an embodiment, the first device 100 may transmit the first log information to a server. The server may generate the content recommending information based on the first log information and transmit the generated content recommending information to the first device 100.

In an embodiment, the first device 100 may transmit the user profile to the server. The server that has received the user profile may generate the content recommending information based on the user profile and transmit the generated content recommending information to the first device 100.

In an embodiment, the first device 100 may store the user profile in a storage unit. In this regard, the first device 10 may update a user profile that is previously stored in the storage unit by using the newly received first log information.

The first device 100 may display the content recommending information through a display unit at operation S430. The display unit may display content included in the content recommending information differently from content that is not included in the content recommending information. The display unit of the first device 100 may differentiate display locations or magnitude of the content included in the content recommending information and the content that is not included in the content recommending information. In addition, the display unit may differentiate the content included in the content recommending information and the content that is not included in the content recommending information using graphic adjustment such as highlighting, grouping, etc.

In an embodiment, the first device 100 may output the content recommending information as audio through an audio output unit.

In an embodiment, the first device 100 may transmit the content recommending information to the external device.

Figure 5:
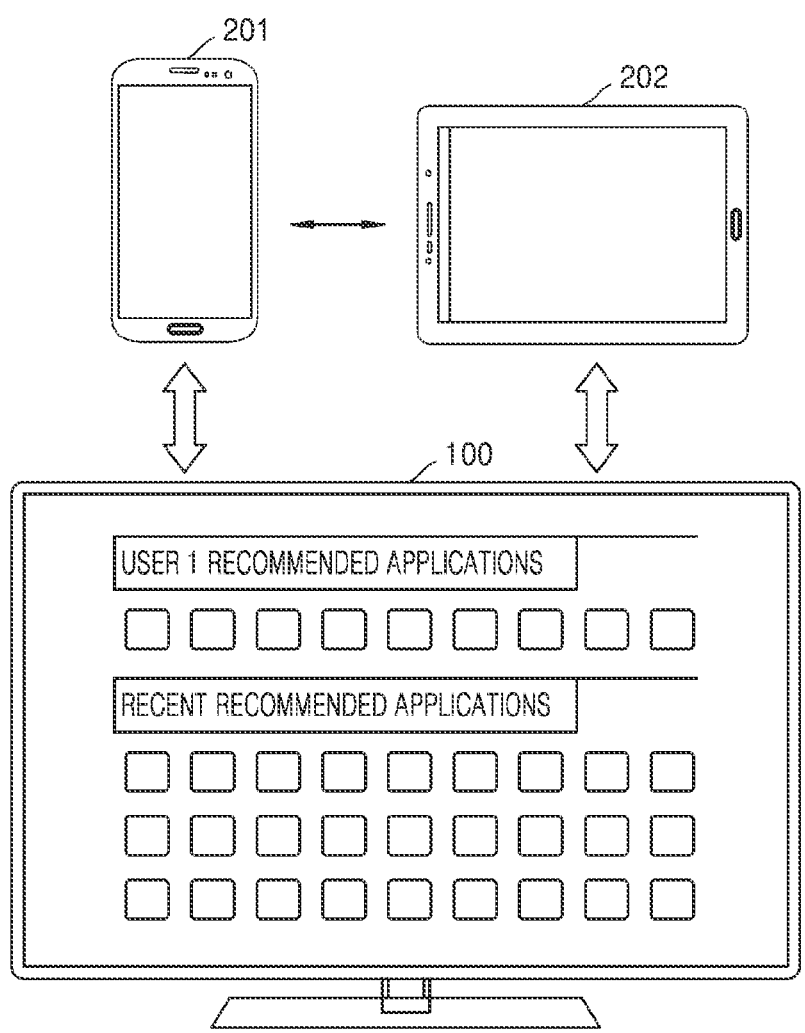
FIG. 5 is a diagram describing a method in which a first device generates and provides content recommending information based on its log information and log information of a plurality of external devices according to an embodiment of the present disclosure.

FIG. 5 is a diagram describing a method in which a first device generates and provides content recommending information based on second log information and first log information of a plurality of external devices according to an embodiment of the present disclosure.

Referring to FIG. 5, the first device 100 may be a smart TV. The plurality of external devices 201 and 202 may include a mobile device and a tablet. However, the embodiment is not limited thereto. The first device 100 and the plurality of external devices 201 and 202 may be implemented as various devices. The mobile device 201 and the tablet 202 may transmit first log information from the mobile device 201 and the tablet 202 to the smart TV 100. The smart TV 100 may generate the content recommending information based on the received first log information and its second log information. In this regard, the content recommending information may include a recommended application. The smart TV 100 may display the recommended applications included in the content recommending information on a display unit. As shown in FIG. 5, the smart TV 100 may transmit the content recommending information to the mobile device 201 and the tablet 202.

In an embodiment, the smart TV 100 may generate the content recommending information based on only the received first log information.

In an embodiment, the mobile device 201 may be a master device, and the tablet 202 may be a slave device.

The slave device 202 and the master device 201 may perform handshaking. For example, the slave device 202 may transmit a synchronization signal to the master device 201. The master device 201 may transmit an acknowledgement signal to the slave device 202 in response to the synchronization signal.

If handshaking is completely performed, the slave device 202 may transmit log information (log information A) of the slave device 202 to the master device 201. The first device 100 and the master device 201 may perform handshaking. If handshaking is completely performed, the master device 210 may transmit the log information A and log information (log information B) of the master device 201 to the first device 100. The first device 100 may generate the content recommending information by using the log information A, the log information B, and log information for the first device 100 (second log information). The first device 100 may transmit the content recommending information to the master device 201. The master device 201 may transmit the received content recommending information to the slave device 202.

In an embodiment, the first device 100 may receive first log information from the external devices 201 and 202 through short range communication and may transmit the content recommending information to the external devices 201 and 202.

In an embodiment, short range communication may include at least one of NFC, Wi-Fi, Bluetooth, IR, or Wi-Fi direct.

Figure 6:
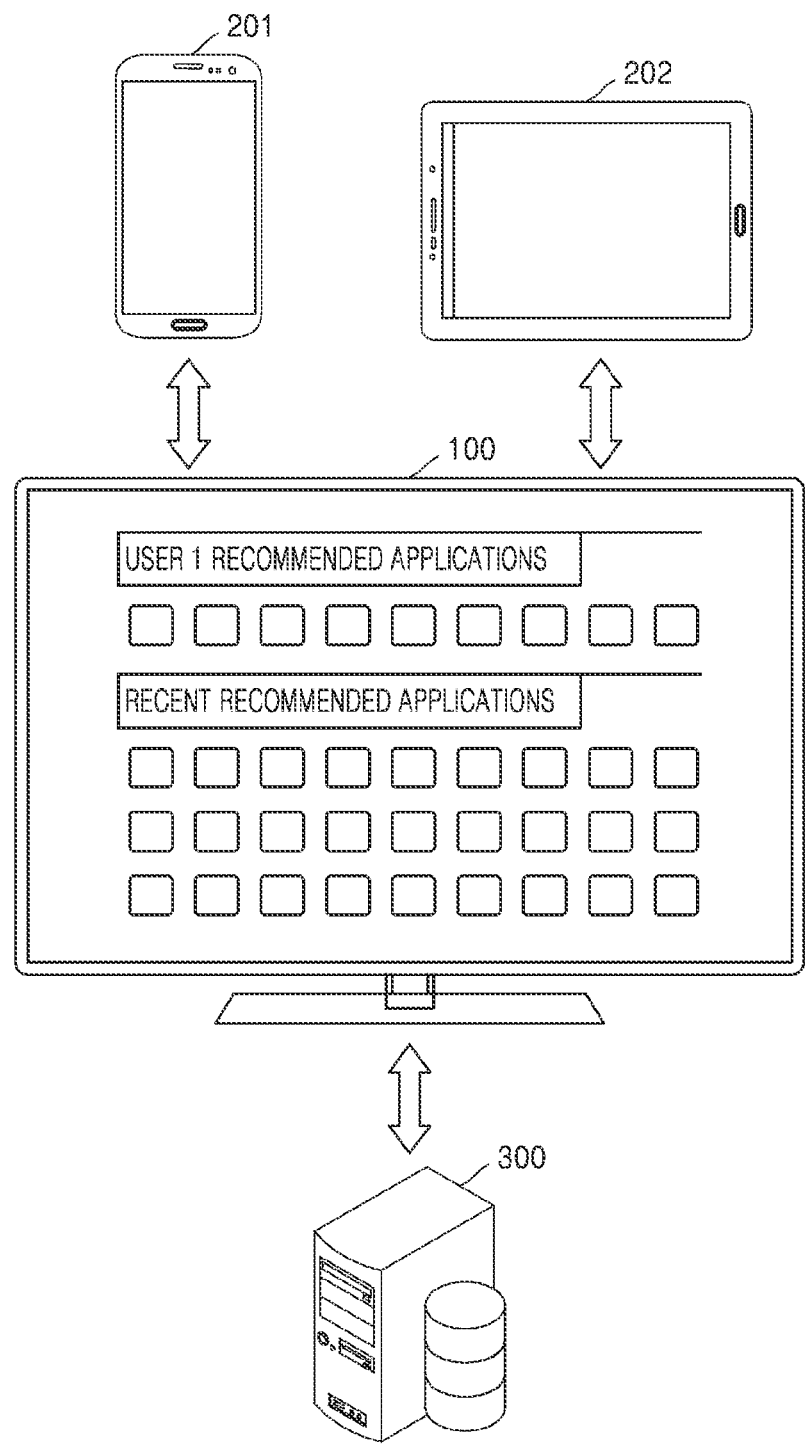
FIG. 6 is a diagram describing a method in which a server generates and provides content recommending information based on log information of a first device and external devices according to an embodiment of the present disclosure.

FIG. 6 is a diagram describing a method in which a server generates and provides content recommending information based on log information of a first device and external devices according to an embodiment of the present disclosure.

Referring to FIG. 6, the first device 100 may be a smart TV. The plurality of external devices 201 and 202 may include a mobile device and a tablet. The server may be a desktop. However, the embodiment is not limited thereto. The first device 100, the server 300, and the plurality of external devices 201 and 202 may be implemented as various devices. The mobile device 201 and the tablet 202 may transmit respective first log information to the smart TV 100. The smart TV 100 may transmit the received first log information and the second log information for the smart TV 100 to the server 300. The server 300 may generate the content recommending information based on the first log information and the second log information and transmit the content recommending information to the smart TV 100. The content recommending information may include recommended applications. In this regard, the smart TV 100 may display the recommended applications on a display unit. The smart TV 100 may transmit the content recommending information to at least one of the mobile device 201 and the tablet 202. Each of the external devices 201 and 202 may display the received content recommending information on a display unit.

In an embodiment, the first device 100 may receive the first log information from the external devices 201 and 202 through short range communication and may transmit the content recommending information to the server 300. The server 300 may transmit the content recommending information to the first device 100 and the external devices 201 and 202 through short range communication. The short range communication may include at least one of NFC, Wi-Fi, Bluetooth, IR, or Wi-Fi direct.

In an embodiment, the mobile device 201 may be a master device, and the tablet 202 may be a slave device.

Figure 7:
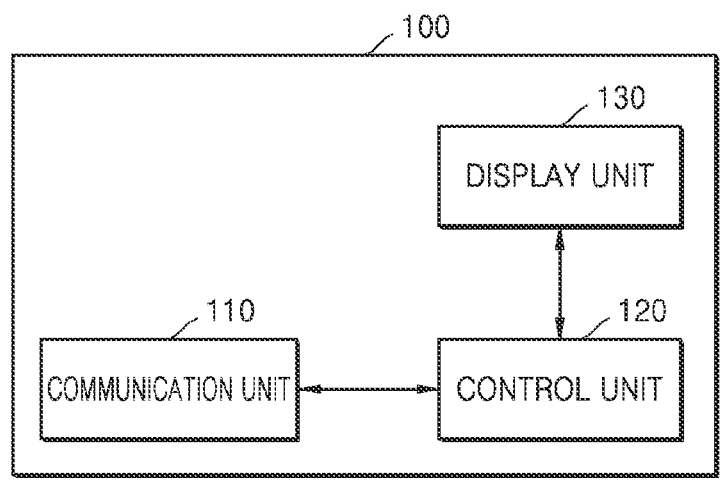
FIG. 7 is a block diagram of a configuration of a first device for providing content recommending information according to an embodiment of the present disclosure.

FIG. 7 is a block diagram of a configuration of a first device for providing content recommending information according to an embodiment of the present disclosure.

Referring to FIG. 7, the first device 100 may include a communication unit 110, a control unit 120, and a display unit 130.

The display unit 130 may generate a driving signal by converting an image signal, a data signal, an on screen display (OSD) signal, a control signal, etc. that are processed by the control unit 120. The display unit 130 may be implemented as a plasma display panel (PDP), a liquid crystal display (LCD), an organic LCD (OLCD), a flexible display, etc. or may be implemented as a three dimensional (3D) display. The display unit 130 may be configured as a touch screen and thus may be used an input apparatus in addition to an output apparatus.

In an embodiment, the display unit 130 may display a content list including at least one content item.

The control unit 120 according to an embodiment may process and input the image signal to the display unit 130. Accordingly, an image corresponding to the image signal may be displayed on the display unit 130.

The control unit 120 may include a profile generation unit (not shown) that generates a user profile based on first log information and second log information. The control unit 120 may include a keyword detection unit (not shown) and a recommending information generation unit (not shown).

The control unit 120 may detect recommendation keywords based on the frequency of keywords included in the first log information and the second log information. The recommendation keywords may include a keyword reflecting user tendency or preference. The first device 100 may compare the recommendation keywords and content information and generate the content recommending information based on contents included in the content information. The content information may include titles of the content, metadata thereof, and descriptions thereof.

In an embodiment, the control unit 120 may include a keyword collection unit (not shown) that collects keywords from the first log information and the second log information, a filtering unit (not shown) that filters a keyword which does not reflect user content selection preference among the collected keywords and remains only the recommendation keyword, and a weighting unit (not shown) that assigns weights to the recommendation keywords according to a predefined weight criterion.

In an embodiment, the user profile may include one or more recommendation keywords.

In an embodiment, the control unit 120 may generate the content recommending information including the at least one recommended content based on the user profile.

In an embodiment, the communication unit 110 may include a receiving unit (not shown) that may receive the first log information from the second device 200 and a transmission unit (not shown) that may transmit the content recommending information to the second device 200.

In an embodiment, the receiving unit may perform handshaking with an external device. For example, the external device may transmit a synchronization signal to the first device 100, and the first device 100 may transmit an acknowledgement signal to the external device in response to the synchronization signal.

In an embodiment, the communication unit 110 may use short range communication. The short range communication technology may include at least one of NFC, Wi-Fi, Bluetooth, IR, or Wi-Fi direct.

In an embodiment, the first device 100 may further include a user input unit (not shown) that receives user login information. The first device 100 may receive only the first log information relating to a specific user among log information stored in the external device by using the user login information. Likewise, the first device 100 may use only the second log information relating to the specific user among the log information stored in a storage unit by using the user login information. The log information relating to the specific user may include a search history, a browsing history, a content reproduction list, etc., which are compiled as the specific user uses the first device 100 or the external device. When the first device 100 generates the user profile based on only the log information relating to the specific user, a personalized user profile may be generated. When the first device 100 generates the content recommending information based on the personalized user profile, the content recommending information reflecting only content preference of the specific user may be generated.

In an embodiment, the first device 100 may further include a storage unit (not shown) that may store at least one of the first log information received from the external device, the user profile, and the content recommending information.

Figure 8:
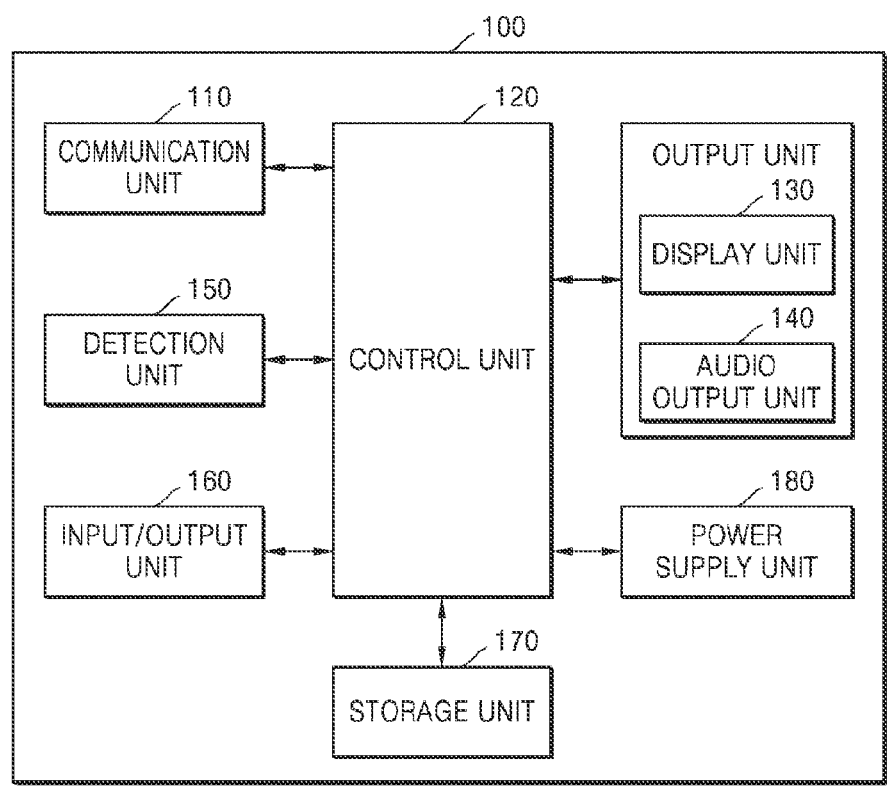
FIG. 8 is a block diagram of a configuration of a first device for providing content recommending information according to an embodiment of the present disclosure.

FIG. 8 is a block diagram of a configuration of a first device for providing content recommending information according to an embodiment of the present disclosure.

Referring to FIG. 8, the first device 100 according to an embodiment may include the communication unit 110, the control unit 120, an output unit including the display unit 130 and an audio output unit 140, a detection unit 150, an input/output unit 160, a storage unit 170, and a power supply unit 180.

The same descriptions of the communication unit 110, the control unit 120, and the display unit 130 as provided with reference to FIG. 7 above are omitted in FIG. 8.

The communication unit 110 may connect the first device 100 to an external device under control of the control unit 120. The control unit 120 may perform transmission/reception to/from the external device connected via the communication unit 110, download an application from the external device, or perform web browsing. The communication unit 110 may include a combination of a wireless local area network (LAN) (not shown), Bluetooth (not shown), and wired Ethernet (not shown) in correspondence to performance and structure of a display apparatus. The communication unit 110 may receive a control signal under control of the control unit 120. The control signal may be implemented as a Bluetooth type signal, an RF type signal, or a Wi-Fi type signal.

The control unit 120 may control general operations of the first device 100 and signal flows between internal elements thereof and processing data. When a user input is present or a preset and stored condition is satisfied, the control unit 120 may execute an operating system (OS) and various pieces of contents that are stored in the storage unit 170.

The control unit 120 may include a random access memory (RAM) (not shown) that stores a signal or data that is input from the outside or that is used as a storage region corresponding to various operations performed by the first device 100, a read only memory (ROM) (not shown) that stores a control program for controlling the first device 100, and a processor (not shown).

The processor may include a graphic processing unit (not shown) for graphic processing corresponding to a video. The processor may be implemented as a system on chip (SOC) that integrates a core (not shown) and a graphics processing unit (GPU) (not shown). The processor may be a single core, dual core, triple core, quadruple core, or multi-core processor.

The processor may include a plurality of processors. For example, the processor may be implemented as a main processor and a sub processor that operates in a sleep mode.

As used herein, the term "control unit of a first device" includes a processor, a RAM, and a ROM.

The audio output unit 140 may output audio included in a broadcasting signal received under control of the control unit 120. The audio output unit 140 may output audio (for example, voice and sound) that is input through the communication unit 110 or the input/output unit 160. The audio output unit 140 may output audio stored in the storage unit 170 under control of the control unit 120. The audio output unit 140 may include at least one of a speaker, a headphone output terminal, and a Sony/Philips digital interface (S/PDIF) output terminal. The audio output unit 140 may include a combination of the speaker, the headphone output terminal, and the S/PDIF output terminal.

The detection unit 150 may detect user voice, a user image, or a user interaction.

The input/output unit 160 may receive a video (for example, a moving image, etc.), audio (for example, voice, music, etc.), additional information (for example, an EPG, etc.), and the like from an external device or network under control of the control unit 120. The input/output unit 160 may include one of a high definition multimedia interface (HDMI) port (not shown), a component jack (not shown), a personal computer (PC) port (not shown), and a universal serial bus (USB) port (not shown). The input/output unit 160 may include a combination of the HDMI port, the component jack, the PC port, and the USB port.

It will be understood by those of ordinary skill in the art that the configuration and the operation of the input/output unit 160 may be implemented in various ways according to various embodiments.

The storage unit 170 may store various data, programs or applications for driving and controlling the first device 100 under control of the control unit 120. The storage unit 170 may store signals or data that are input and output in correspondence to driving the display unit 130, the audio output unit 140, the power supply unit 180, the communication unit 110, the detection unit 150, and the input/output unit 160. The storage unit 170 may store control programs for controlling the first device 100 and the control unit 120, applications that are initially provided by a manufacturer or are downloaded, graphical user interfaces (GUIs) relating to the applications, objects (for example, image text, icons, buttons, etc.) for providing the GUIs, user information, documents, databases, or relevant data.

In an embodiment, the term "storage unit" may include the storage unit 170, the RAM and the RAM of the control unit 120, or a memory card (not shown), for example, a micro secure digital (SD) card and a USB memory, mounted in the first device 100. The storage unit 170 may include a non-volatile memory, a volatile memory, a hard disk drive (HDD), or a solid state drive (SDD).

The power supply unit 180 may supply power that is input from an external power source to internal elements of the first device 100 under control of the control unit 120. The power supply unit 180 may supply power that is output from one battery or two or more batteries located in the first device 100 to the internal elements of the first device 100 under control of the control unit 120.

Figure 9:
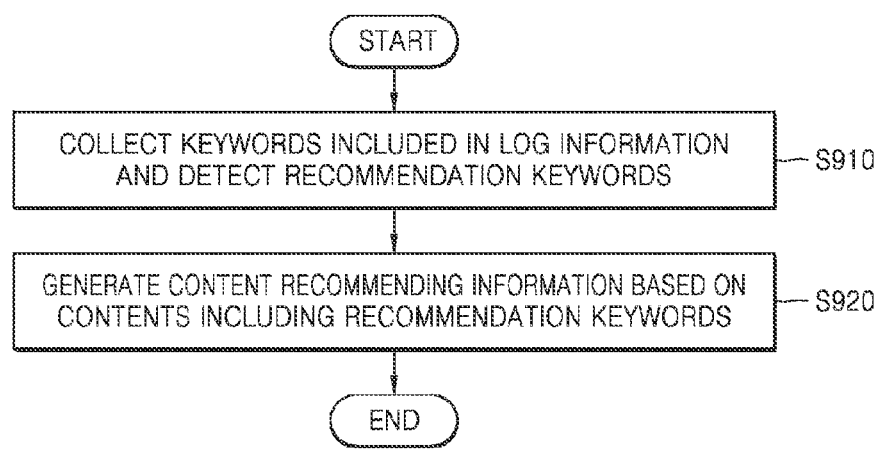
FIG. 9 is a flowchart of a process in which a first device generates content recommending information according to an embodiment of the present disclosure.

FIG. 9 is a flowchart of a process in which a first device generates content recommending information according to an embodiment of the present disclosure.

Referring to FIG. 9, the first device 100 may detect recommendation keywords from keywords included in log information based on the frequency at operation S910.

For example, the first device 100 may detect the recommendation keywords based on an occurrence frequency of the keywords included in first log information and second log information. The first device 100 may process the first log information and the second log information in at least one of (1) full text unigrams that include body text of each web page stripped of html tags; (2) title unigrams that include words containing a <title> tag on html pages; (3) metadata description unigrams that include content containing a <meta name="description"> tag; (4) metadata keywords unigrams that include content containing a <meta name="keywords"> tag; (5) extracted terms that include a set of keywords extracted from web pages and uniform resource locators (URLs) that a user visited; and (6) noun phrases that are extracted from text of each web page and split into sentences using a sentence splitter or a tokenization script.

In an embodiment, the control unit 120 of the first device 100 may filter keywords that do not reflect user content selection preference. To this end, the control unit 120 may use a well-known filtering technology such as WorldNet dictionary filtering and Google N-gram filtering.

In an embodiment, the control unit 120 of the first device 100 may assign weights to the filtered keywords or keywords that are not filtered. A weighting algorithm may include TF weighting, TF-IDF weighting, BM25 weighting, and combination thereof.

TF weighting is a weight value based on an occurrence frequency of a term and may be expressed in the following Equation:

$$TF_{ij} = f_{ij}/\max_k \qquad \text{Equation 1}$$

In the Equation above, $f_{ij}$ denotes an occurrence frequency of a term i in a document j among N documents. $TF_{ij}$ is the weight value may be calculated by dividing $f_{ij}$ by occurrence frequency $\max_k$ of a most frequent term. In this regard, only the occurrence frequency of the most frequent term may be $\max_k$ excluding stop words. $TF_{ij}$ of the most frequent term in the document j is determined as 1, while $TF_{ij}$ of remaining terms of the document j is determined as a value smaller than 1.

TF-IDF weighting is a weight value indicating how important a specific word is in a set of documents including several documents. Term frequency (TF) is a value indicating how frequently a specific term occurs in a document. Document frequency (DF) is a value indicating how frequently a specific term occurs in a set of documents. Inverse (IDF) is an inverse value of DF. TF-IDF is a value by multiplying TF and IDF. IDF is determined according to a nature of the set of documents. For example, since a term "atom" does not usually occur in a general document, the IDF value of the "atom" may be increased and may be a core term of a document. However, since the "atom" is a common term in a set of documents regarding the atom, other terms used to classify and identify documents may obtain high weights. The TF value may be obtained as the total occurrence frequency of a term in a document. When the total occurrence frequency of a term t in a document is f(t,d), a most simple Equation of calculating TF(t,d) may be expressed as TF(t,d)=f(t,d). In addition, the TF value may be calculated using the following:

Boolean frequency: TF(t,d)=1 or 0, (if t occurs in d once, TF(t,d)=1, and if not, TF(t,d)=0);

Log scale frequency: TF(t,d)=log(f(t,d)+1);

Increase frequency: a frequency value of a term is adjusted according to a length of a document.

$$TF(t, d) = 0.5 + \frac{0.5 * f(t, d)}{\max\{f(w, d) : w \in d\}} \qquad \text{Equation 2}$$

The IDF is a value indicating how frequently a specific term occurs in a set of documents. The IDF value may be obtained using a log by dividing the number of all documents included in the set of documents by the number of documents including the term.

$$IDF(t, D) = \log \frac{|D|}{|\{d \in D : t \in d\}|} \qquad \text{Equation 3}$$

|D|: number of all documents included in the set of documents

|{d∈D:t∈d}|: number of documents including the term t (when the term t is not present in any of the documents, this results in 0 as a denominator. To prevent this, '1+|{d∈D: t∈d}|' is generally used).

TF-IDF may be expressed in the following Equation:

$$TF\text{-}IDF(t,d,D) = TF(t,d) * IDF(t,D) \qquad \text{Equation 4}$$

The TF-IDF value may be greater when TF is higher in a specific document and the number of documents including a term among all documents included in a set of documents is smaller. Thus, the TF-IDF value may be used to obtain an effect of filtering a term that frequently occurs in all documents.

BM25 weighting is given by the following Equation:

$$w_{pBM25}(t_i) = \log \frac{(rti + 0.5)(N - nti + 0.5)}{(nti + 0.5)(R - rti + 0.5)} \quad \text{Equation 5}$$

In the Equation above, N denotes the number of documents on the web which may be estimated using an N-Gram corpus tool. $nt_i$ denotes the number of documents in a corpus that contains the term $t_i$. R denotes the number of documents in browsing history. $rt_i$ denotes the number of documents in the browsing history that contains the term $t_i$.

Only TF weighting, TF-IDF weighting, and BM25 weighting are described as the weighting algorithm above but the various embodiments are not limited thereto. Other algorithms or methods may be used to assign weights.

The first device 100 may generate a user profile including at least one of recommendation keywords, URLs of web pages visited by the user, the number of the URLs, and a search word list of the user.

The storage unit 170 of the first device 100 may store the user profile. The first device 100 may update the stored user profile based on at least one of first log information and second log information.

A method of generating the user profile according to an embodiment may include, but are not limited to, relevance feedback, genetic algorithms, neural networks, and the Bayesian classifier.

The first device 100 may generate the content recommending information based on contents including the recommendation keywords in content's information at operation 5920.

The content information according to an embodiment may include titles of contents, metadata thereof, and descriptions thereof.

The first device 100 according to an embodiment may compare the content information and the recommendation keywords. When the content information includes the recommendation keywords, the first device 100 may set corresponding content as recommended content.

The content recommending information according to an embodiment may include at least one recommended content.

Figure 10:
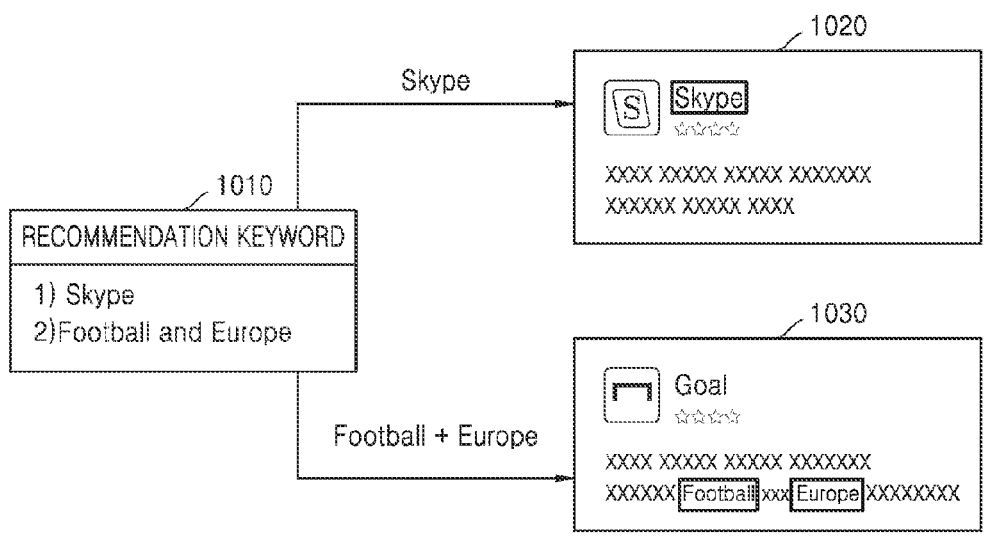
FIG. 10 is a diagram of an example of a process in which a first device generates content recommending information according to an embodiment of the present disclosure.

FIG. 10 is a diagram of an example of a process in which the first device 100 generates content recommending information according to an embodiment of the present disclosure.

Referring to FIG. 10, a user profile according to an embodiment may include a recommendation keyword 1010 'Skype' and 'Football and Europe'.

The first device 100 may compare 'Skype' and 'Football and Europe' and content titles. For example, the first device 100 may determine whether 'Skype' is included in the content titles. When the content titles include 'Skype', the first device 100 may set corresponding content as recommended content. As shown in FIG. 10, when 'Skype' matches a title of an application 1020 called 'Skype', the first device 100 may set the application 1020 as the recommended content.

When the content titles do not include 'Skype', the first device 100 may compare 'Skype' and descriptions of contents or metadata thereof. As shown in FIG. 10, 'Football and Europe' is not included in a title of an application 1030 'Goal' but is included in a description of the application 1030. Thus, the first device 100 may set the application 1030 'Goal' as the recommended content.

The first device 100 according to an embodiment may generate the content recommending information based on the recommended contents.

Figure 11:
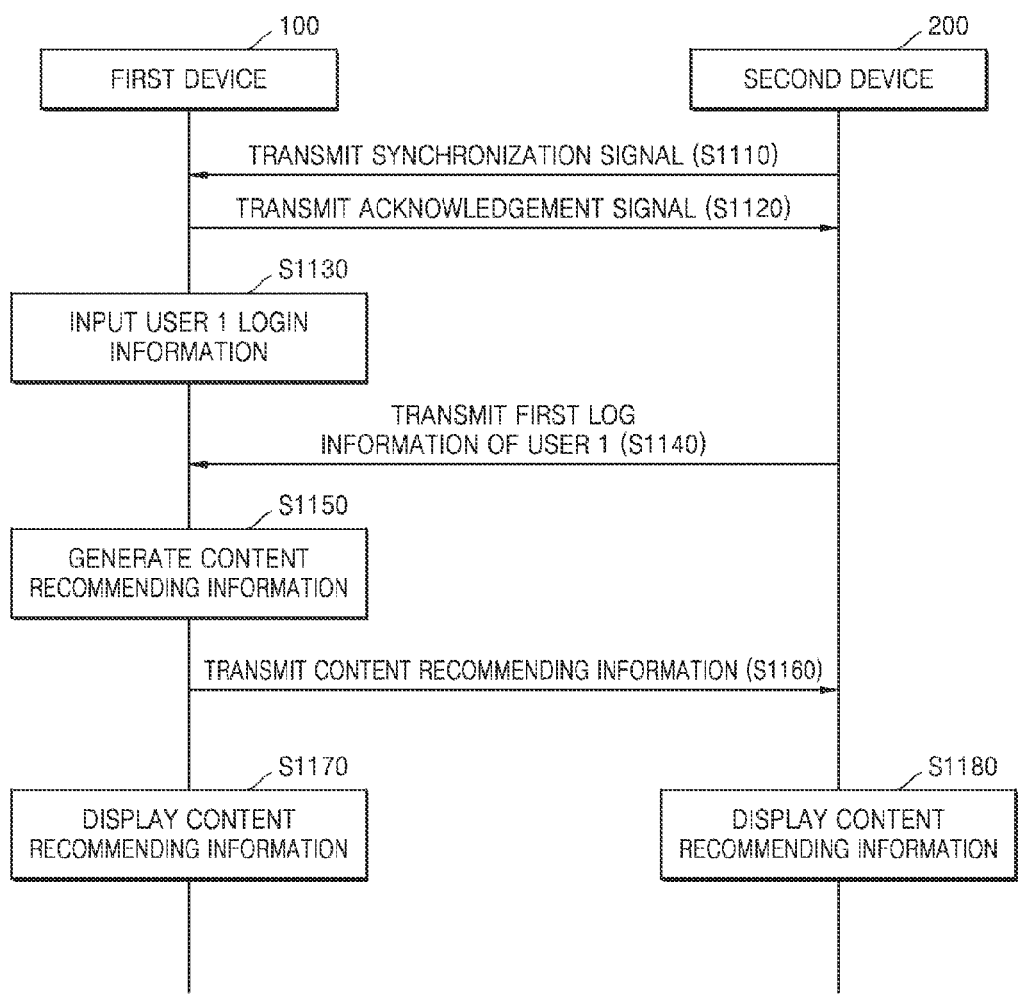
FIG. 11 is a flowchart of a method in which a first device receives user login information and generates and provides content recommending information according to an embodiment of the present disclosure.

FIG. 11 is a flowchart of a method in which the first device 100 receives user login information and generates and provides content recommending information according to an embodiment of the present disclosure.

Referring to FIG. 11, the first device 100 and the second device 200 may perform handshaking. For example, the second device 200 may transmit a synchronization signal to the first device 100 at operation S1110. The first device 100 may transmit an acknowledgement signal to the second device 200 in response to the synchronization signal at operation S1120.

The first device 100 may receive login information of a user 1 through a user input unit at operation S1130. The first device 100 may receive first log information relating to the user 1 among log information stored in the second device 200 based on the login information of the user 1 at operation S1140. The first device 100 may generate the content recommending information based on second log information relating to the user 1 among log information of the first device 100 and the first log information at operation S1150. The log information relating to the user 1 may include a search history, a content reproduction list, and a browsing history, etc., which are compiled as the user 1 uses the first device 100 or the second device 200. When the first device 100 generates the content recommending information based on only the log information relating to the user 1, the content recommending information personalized to the user 1 may be provided.

The first device 100 may transmit the content recommending information to the second device 200 at operation S1160. The first device 100 and the second device 200 may display the content recommending information through display units at operations S1170 and S1180.

In an embodiment, the first device 100 may generate the content recommending information based on only the first log information received from the second device 200.

In an embodiment, the first log information may include at least one relating to the user 1 among cache files, cookies, a browsing history, a download history, and a search history that are stored in the second device 200, contents stored in the second device 200, and data necessary for executing at least one content item in the second device 200. The second log information may include at least one relating to the user 1 among cache files, cookies, a browsing history, a download history, and a search history that are stored in the first device 100, contents stored in the first device 100, and data necessary for executing at least one piece of content in the first device 100.

In an embodiment, the first device 100 may use a short range communication technology to receive the first log information from the second device 200. The short range communication technology may include at least one of NFC, Wi-Fi, Bluetooth, IR, or Wi-Fi direct.

In an embodiment, the first device 100 and the second device 200 may be included in a home network or IOT.

In an embodiment, the content may include at least one of applications, books, music, A/V data, services, games, multimedia, video, calendars, schedules, environment settings, and user accessible data.

In an embodiment, the first device 100 and the second device 200 may store the content recommending information in the storage unit 170.

In an embodiment, the first device 100 and the second device 200 may control the display unit 130 based on the generated content recommending information.

In an embodiment, the first device 100 may control the display unit 130 based on the content recommending information. For example, the first device 100 may display content included in the content recommending information differently from content that is not included in the content recommending information on the display unit 130. For example, the first device 100 may differentiate display locations or magnitude of the content included in the content recommending information and the content that is not included in the content recommending information.

When the first device 100 does not store the recommended content included in the content recommending information, the first device 100 according to an embodiment control downloading of the recommended content from an external server.

Figure 12:
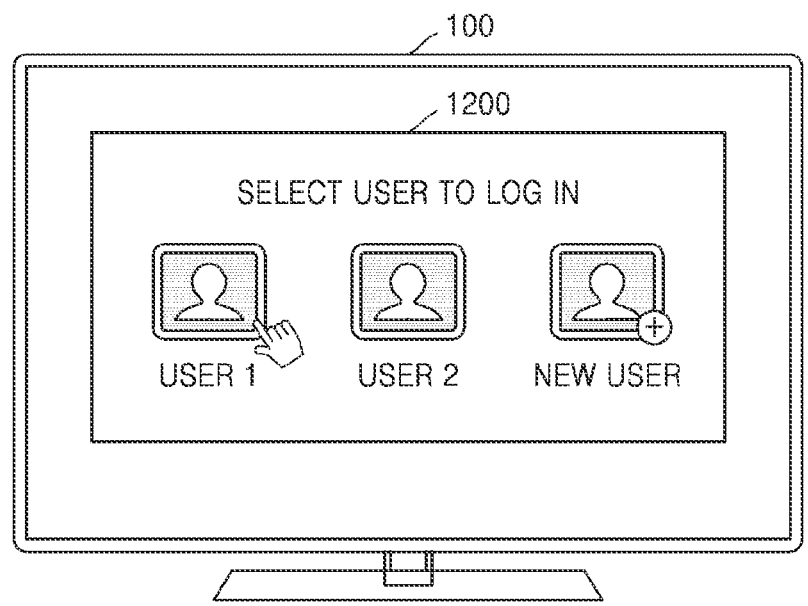
FIG. 12 is a diagram of an example in which a first device receives user login information according to an embodiment of the present disclosure.

FIG. 12 is a diagram of an example in which a first device receives user login information according to an embodiment of the present disclosure.

Referring to FIG. 12, in an embodiment, the first device 100 may display a GUI screen 1200 that may receive the user login information. For example, a user may select an icon matching his/her user login information on the GUI screen 1200. As shown in FIG. 12, a user 1 may click an icon "user 1", and a user 2 may input user login information by clicking an icon "user 2". A new user may generate new user login information by clicking an icon "new user".

The first device 100 may receive first log information relating to a user who logged in by using the user login information. The first device 100 may generate a user profile by using the first log information and second log information that is stored in the first device 100 and is related to the user who logged in.

In an embodiment, an input tool for selecting an icon may include a remote controller, a mouse, a touch pad, a keyboard, a button, and a touch screen.

Figure 13:
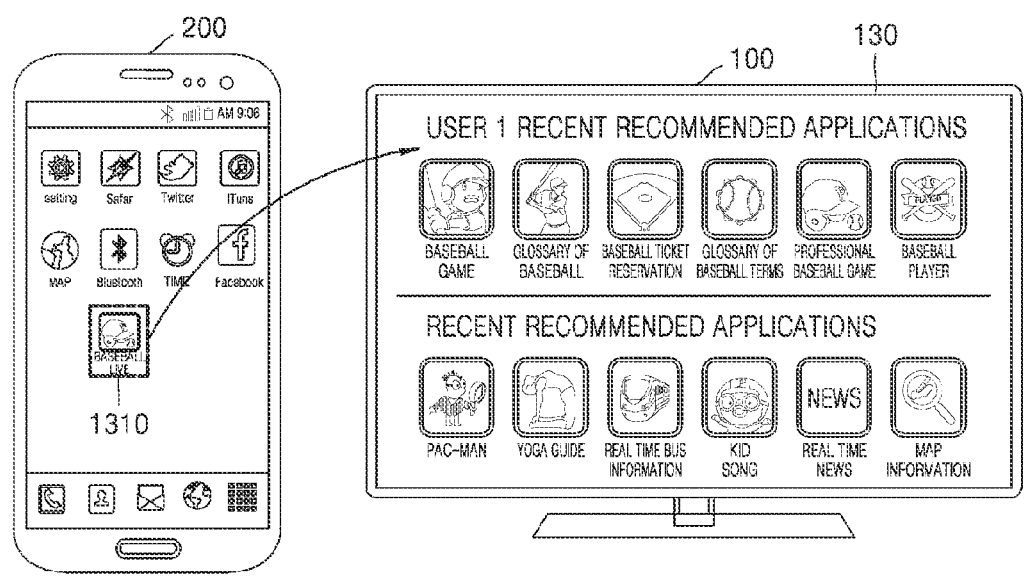
FIG. 13 is a diagram of an example of a method in which a first device displays content recommending information according to an embodiment of the present disclosure.

FIG. 13 is a diagram of an example of a method in which a first device displays content recommending information according to an embodiment of the present disclosure.

Referring to FIG. 13, the smart TV 100 may receive application information stored in the mobile device 200 and display application recommending information for a user 1. The smart TV 100 may receive information (first log information) that an application "baseball live" 1310 is stored in the mobile device 200. In this regard, the smart TV 100 may detect a term "baseball" as a recommendation keyword. The smart TV 100 may generate the application recommending information for the user 1 based on the recommendation keyword. The application recommending information may include recommended applications such as games relating to "baseball", a glossary of terms, a baseball ticket reservation, a glossary of baseball, etc. The display unit 130 of the smart TV 100 may display the recommended applications differently from other applications displayed thereon. As shown in FIG. 13, the display unit 130 may display "user 1 recent recommended applications" and "recent recommended applications" by differentiating display regions of the "user 1 recent recommended applications" and the "recent recommended applications". FIG. 13 shows the example of displaying the "user 1 recent recommended applications" on an upper side of a display region and the "recent recommended applications" on a lower side thereof. The first device 100 and the second device 200 are respectively illustrated as the smart TV 100 and the mobile device 200 in FIG. 13 but are not limited thereto.

In an embodiment, the first device 100 may display content included in the content recommending information differently from content that are not included in the content recommending information using graphic adjustment. Graphic adjustment may include highlighting, resizing, moving, shortlisting, arranging, grouping, etc.

Figure 14:
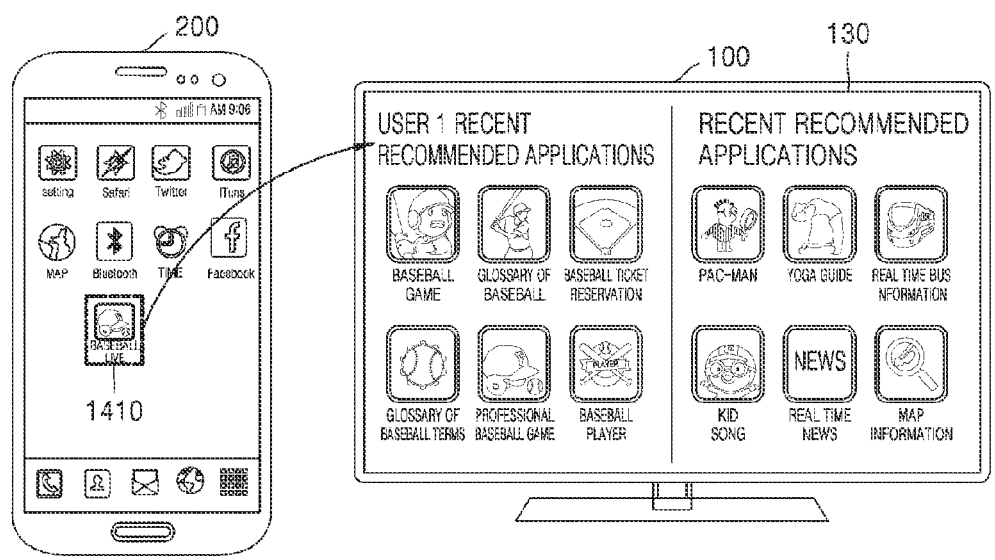
FIG. 14 is a diagram of an example of a method in which a first device displays content recommending information according to an embodiment of the present disclosure.

FIG. 14 is a diagram of an example of a method in which a first device displays content recommending information according to an embodiment of the present disclosure.

Referring to FIG. 14, the smart TV 100 may receive information (first log information) that an application "baseball live" 1410 is stored in the mobile device 200. In this regard, the smart TV 100 may detect a term "baseball" as a recommendation keyword. The smart TV 100 may generate the application recommending information for a user 1 based on the recommendation keyword. The application recommending information may include recommended applications such as games relating to "baseball", a glossary of terms, a baseball ticket reservation, a glossary of baseball, etc. The display unit 130 of the smart TV 100 may display the recommended applications differently from other applications displayed thereon. As shown in FIG. 14, the display unit 130 may display "user 1 recent recommended applications" and "recent recommended applications" by differentiating display regions of the "user 1 recent recommended applications" and the "recent recommended applications". FIG. 14 shows the example of displaying the "user 1 recent recommended applications" on a left side of a display region and the "recent recommended applications" on a right side thereof. The first device 100 and the second device 200 are respectively illustrated as the smart TV 100 and the mobile device 200 in FIG. 14 but are not limited thereto.

Figure 15:
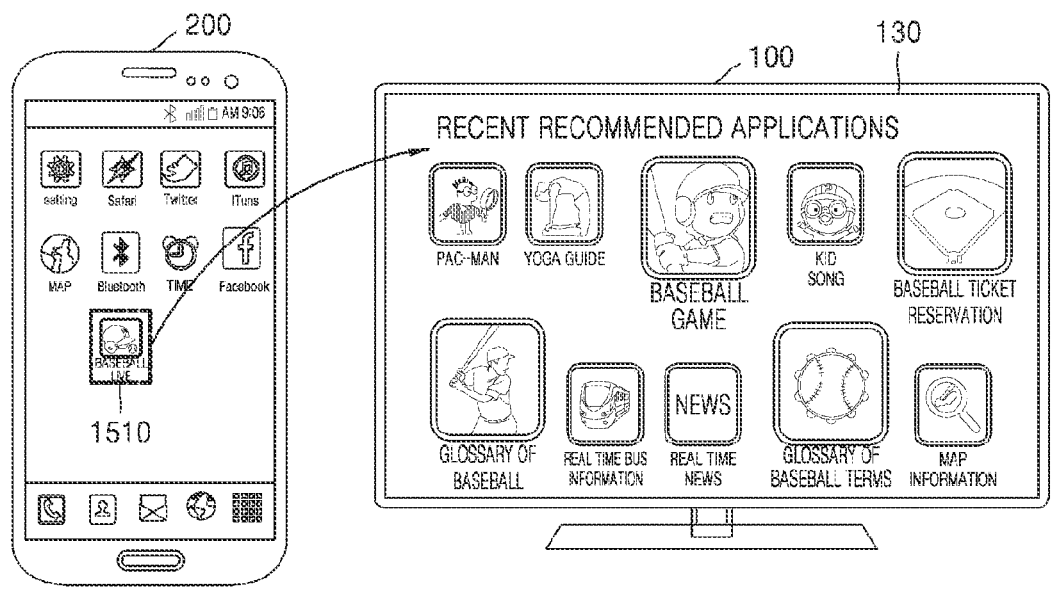
FIG. 15 is a diagram of an example of a method in which a first device displays content recommending information according to an embodiment of the present disclosure.

FIG. 15 is a diagram of an example of a method in which a first device displays content recommending information according to an embodiment of the present disclosure.

Referring to FIG. 15, the smart TV 100 may receive information (first log information) that an application "baseball live" 1510 is stored in the mobile device 200. In this regard, the smart TV 100 may detect a term "baseball" as a recommendation keyword. The smart TV 100 may generate the application recommending information for a user 1 based on the recommendation keyword. The application recommending information may include recommended applications such as games relating to "baseball", a glossary of terms, a baseball ticket reservation, a glossary of baseball, etc. The display unit 130 of the smart TV 100 may display the recommended applications differently from applications displayed thereon. As shown in FIG. 15, the display unit 130 may display "baseball games", "baseball ticket reservation", "glossary of baseball", and "glossary of baseball terms" and other applications displayed thereon by magnifying "baseball games", "baseball ticket reservation", "glossary of baseball", and "glossary of baseball terms" at a first magnification and reducing the other applications at a second magnification determined based on the first magnification. In this regard, a ratio between the first magnification and the second magnification may vary according to a user and a peripheral environment. The first device 100 and the second device 200 are respectively illustrated as the smart TV 100 and the mobile device 200 in FIG. 15 but are not limited thereto.

Figure 16:
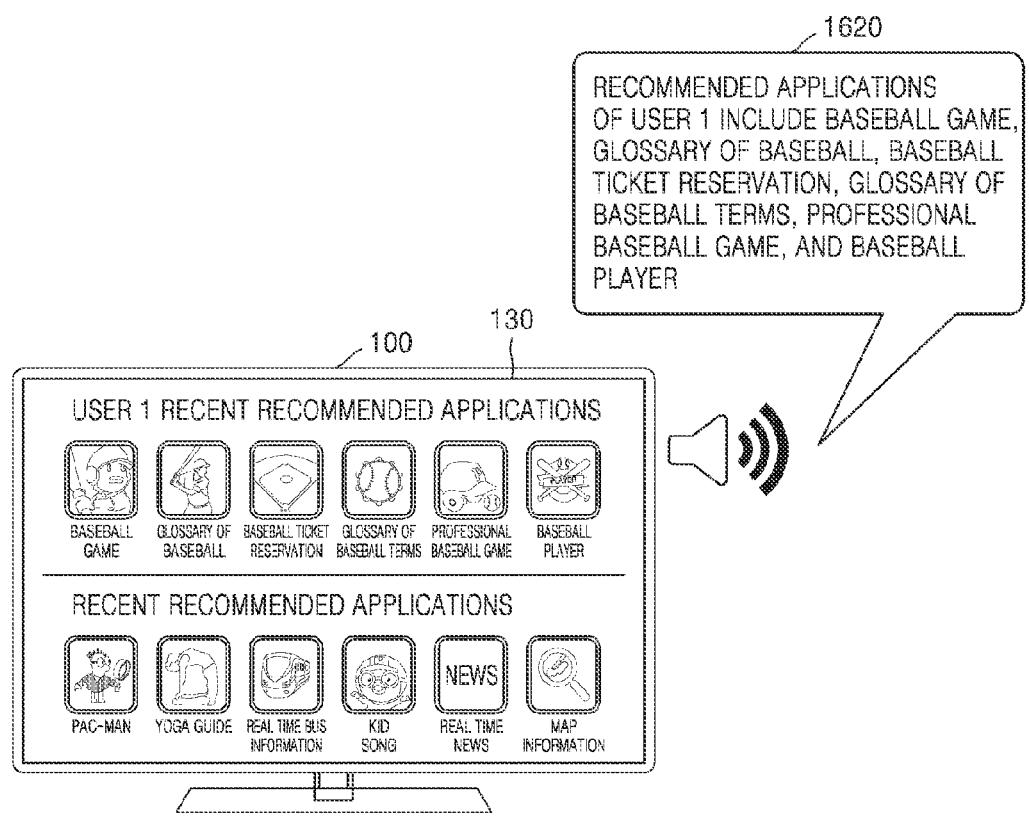
FIG. 16 is a diagram of an example in which a first device outputs content recommending information as audio through an audio output unit according to an embodiment of the present disclosure.

FIG. 16 is a diagram of an example in which a first device outputs content recommending information as audio through an audio output unit according to an embodiment of the present disclosure.

Referring to FIG. 16, the smart TV 100 may provide 1620 application recommending information through the audio output unit 140. For example, the smart TV 100 may output application information included in "user 1 recent recommended applications" as audio through the audio output unit 140. In this way, a user may receive the application recommending information when the user is away from the smart TV 100 or is unable to recognize information through the display unit 130 of the smart TV 100. The application's information may include titles of applications, metadata thereof, and descriptions thereof In an embodiment, the smart TV 100 may output the application information through the audio output unit 140 and simultaneously display the content recommending information through the display unit 130. However, display and output of audio are not necessarily provided simultaneously and may vary according to a user input or a peripheral environment. The first device 100 and the second device 200 are respectively illustrated as the smart TV 100 and the mobile device 200 in FIG. 16 but are not limited thereto.

Figure 17:
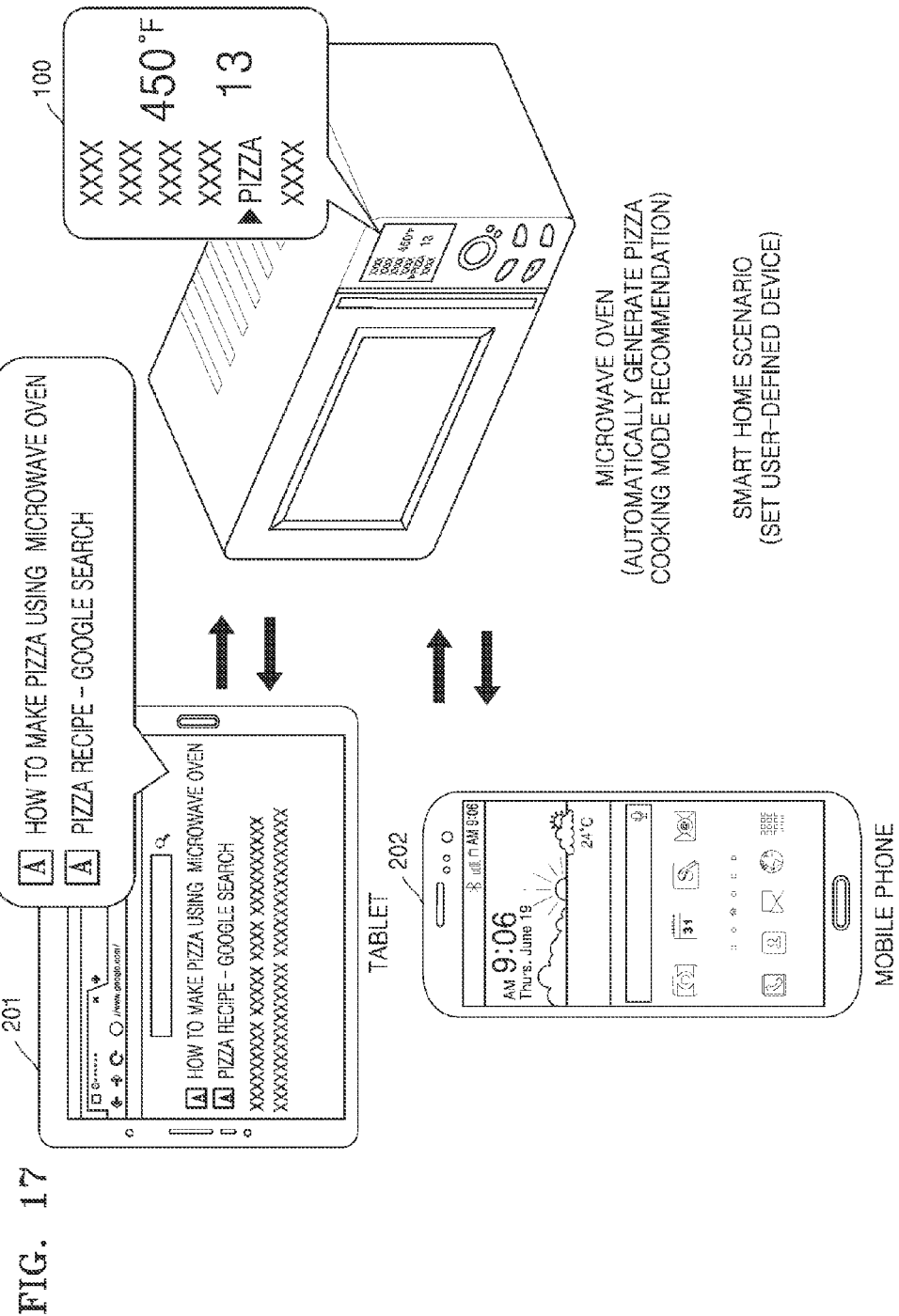
FIG. 17 is a diagram of an Internet of things (IOT) scenario that generates content recommending information based on log information received from a plurality of second devices according to an embodiment of the present disclosure.

FIG. 17 is a diagram of an IOT scenario that generates content recommending information based on log information received from a plurality of external devices according to an embodiment of the present disclosure.

Referring to FIG. 17, a microwave oven 100 (the first device 100) may receive the log information including a search history from the tablet 201 and/or the mobile phone 202. For example, the log information may include a history that a user searches for "pizza recipe" or "how to make pizza using a microwave oven" by using the tablet 201 and/or the mobile phone 202. The control unit 120 of the microwave oven 100 may generate a recommended cooking mode based on a cooking mode frequently used by the user among a plurality of cooking modes stored in the storage unit 170 of the microwave oven 100.

In an embodiment, the microwave oven 100 may display the recommended cooking mode to the user or automatically set a cooking mode.

In an embodiment, the microwave oven 100 may generate the recommended cooking mode based only the log information received from the tablet 201 and/or the mobile phone 202.

In an embodiment, the microwave oven 100 may display the recommended cooking mode through the display unit 130.

In an embodiment, the microwave oven 100 may output information regarding the recommended cooking mode as audio through the audio output unit 140.

As described above, according to an embodiment, a first device may communicate with a plurality of devices to receive relevant information and accordingly may generate content recommending information by using log information included in the plurality of devices.

According to an embodiment, a first device may provide content recommending information to a user by displaying the content recommending information through a display unit or transmitting the content recommending information to an external device.

According to an embodiment, a first device may provide personalized content recommending information of users by using user login information.

The image display method according to the above-described embodiments may be implemented as computer instructions which may be executed by various computer means, and recorded on a non-transitory computer-readable recording medium. The non-transitory computer-readable recording medium may include program commands, data files, data structures, or a combination thereof. The program commands recorded on the non-transitory computer-readable recording medium may be specially designed and constructed for the inventive concept or may be known to and usable by one of ordinary skill in a field of computer software. Examples of the non-transitory computer-readable recording medium include hardware devices specially configured to store and perform program instructions such as magnetic storage media (e.g., ROM, floppy disks, hard disks, etc.), and optical recording media (e.g., compact disc-ROMs (CD-ROMs), or digital versatile discs (DVDs)), etc.). Examples of the program commands include a high-level language code that may be executed by a computer using an interpreter as well as a machine language code made by a complier.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operating method performed by a first device comprising at least one processor, the method comprising:
   receiving, by the at least one processor, login information of a user;
   receiving, by the at least one processor, first log information of the user among log information of an external device based on the login information of the user;
   obtaining, by the at least one processor, second log information of the user among log information of the first device based on the login information of the user;
   detecting, by the at least one processor, recommendation keywords from among keywords included in the first log information and the second log information based on an occurrence frequency of the keywords;
   comparing, by the at least one processor, the recommendation keywords and information regarding content, wherein the information regarding content comprises at least one selected from the group of title of the content, metadata of the content, and description of the content;
   generating, by the at least one processor, content recommending information comprising recommended content based on a result of the comparing, wherein the recommended content comprise at least one selected from a group consisting of application, book, music, audio data, video data, service, game, multimedia, calendar, schedule, and configuration; and
   controlling, by the at least one processor, a display to display the content recommending information.

2. The operating method of claim 1,
   wherein the first log information comprises at least one selected from a group consisting of cache files, cookies, a browsing history, a download history, and a search history, which are stored in the external device, content stored in the external device, and data necessary for executing at least one content in the external device, and
   wherein the second log information comprises at least one selected from a group consisting of cache files, cookies, a browsing history, a download history, and a search history, which are stored in the first device, content stored in the first device, and data necessary for executing at least one content in the first device.

3. The operating method of claim 1, further comprising:
controlling, by the at least one processor, the display to display first content corresponding to the recommended content differently from second content that does not correspond to the recommended content from among contents displayed on the display.

4. The operating method of claim 3, further comprising:
magnifying and controlling the display to display, by the at least one processor, the first content at a first magnification; and
reducing and controlling the display to display, by the at least one processor, the second content at a second magnification different from the first magnification.

5. The operating method of claim 3, further comprising:
controlling the display to display, by the at least one processor, the first content on a first region of a screen; and
controlling the display to display, by the at least one processor, the second content on a second region of the screen.

6. The operating method of claim 1, further comprising transmitting, by the at least one processor, the content recommending information to the external device.

7. A first device comprising:
a display; and
at least one processor configured to:
receive login information of a user,
receive first log information of the user among log information of an external device based on the login information of the user,
obtain second log information of the user among log information of the first device based on the login information of the user,
detect recommendation keywords from among keywords included in the first log information and the second log information based on an occurrence frequency of the keywords,
compare the recommendation keywords and information regarding content, wherein the information regarding content comprises at least one selected from the group of title of the content, metadata of the content, and description of the content,
generate content recommending information comprising recommended content based on a result of the comparing, wherein the content comprises at least one selected from a group consisting of application, book, music, audio data, video data, service, game, multimedia, calendar, schedule, and configuration, and
control the display to display the content recommending information.

8. The first device of claim 7,
wherein the first log information comprises at least one selected from a group consisting of cache files, cookies, a browsing history, a download history, and a search history, which are stored in the external device, content stored in the external device, and data necessary for executing at least one piece of content in the external device, and
wherein the second log information comprises at least one selected from a group consisting of cache files, cookies, a browsing history, a download history, and a search history, which are stored in the first device, content stored in the first device, and data necessary for executing at least one piece of content in the first device.

9. The first device of claim 7, wherein the at least one processor is further configured to:
control the display to display first content corresponding to the recommended content differently from second content that does not correspond to the recommended content from among contents displayed on the display.

10. The first device of claim 9, wherein the at least one processor is further configured to:
magnify and control the display to display the first content at a first magnification, and
reduce and control the display to display the second content at a second magnification different from the first magnification.

11. The first device of claim 9, wherein the at least one processor is further configured to: control display to display the first content on a first region of a screen of the display, and
control display to display the second content on a second region of a screen of the display.

12. The first device of claim 7, wherein the at least one processor is further configured to transmit the content recommending information to the external device.

13. The first device of claim 7, further comprising a storage unit configured to store the content recommending information.

14. The first device of claim 7, further comprising an audio output unit configured to output the content recommending information as audio.

15. A first device comprising:
a display; and
at least one processor configured to:
receive login information of a user,
receive first log information of the user among log information of a plurality of external devices based on the log information of the user,
obtain second log information of the user among log information of the first device based on the login information of the user,
detect recommendation keywords from among keywords included in the first log information and the second log information based on an occurrence frequency of the keywords,
compare the recommendation keywords and information regarding content, wherein the information regarding content comprises at least one selected from the group of title of the content, metadata of the content, and description of the content,
generate content recommending information comprising recommended content, based on a result of the comparing, and
control the display to display the content recommending information.

16. The operating method of claim 1, wherein the first device is one selected from a group consisting of a TV and other home appliances, and the external device is one selected from the group consisting of a smart phone, a tablet, and a wearable device.

* * * * *